(12) United States Patent
Frey et al.

(10) Patent No.: US 12,044,178 B2
(45) Date of Patent: Jul. 23, 2024

(54) SYSTEM AND METHOD FOR AIR COOLING FUEL PURGE FLOW

(71) Applicant: General Electric Company, Schenectady, NY (US)

(72) Inventors: George Frederick Frey, Houston, TX (US); Tuy C. Huynh, Sugar Land, TX (US); Jorge Mario Rochin-Machado, Queretaro (MX); Jordan Scott Warton, Pasadena, TX (US); Michael Anthony Acosta, Mont Belvieu, TX (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 79 days.

(21) Appl. No.: 17/570,292

(22) Filed: Jan. 6, 2022

(65) Prior Publication Data

US 2023/0228217 A1 Jul. 20, 2023

(51) Int. Cl.
*F02C 6/08* (2006.01)
*F02C 7/141* (2006.01)
(Continued)

(52) U.S. Cl.
CPC ............... *F02C 7/232* (2013.01); *F02C 6/08* (2013.01); *F02C 7/141* (2013.01); *F02C 7/185* (2013.01); *F05D 2260/213* (2013.01)

(58) Field of Classification Search
CPC .... F02C 7/04; F02C 7/18; F02C 7/185; F02C 7/20; F02C 7/22; F02C 7/232; F02C 6/06;
(Continued)

(56) References Cited

U.S. PATENT DOCUMENTS 2,717,320 A * 9/1955 Shoulders ................ H02K 9/18
165/47
5,095,694 A 3/1992 Shekleton et al.
(Continued)

FOREIGN PATENT DOCUMENTS

CN 103104345 A 5/2013
EP 1783347 A2 9/2007

OTHER PUBLICATIONS

PCT International Search Report and Written Opinion; Application No. PCT/US2022/082609; dated Apr. 5, 2023; 10 pages.

*Primary Examiner* — Todd E Manahan
*Assistant Examiner* — Sean V Meiller
(74) *Attorney, Agent, or Firm* — Fletcher Yoder, P.C.

(57) ABSTRACT

A system includes an air cooling system having a heat exchanger, a fan, and a mount. The heat exchanger includes an inlet, an outlet, and a heat exchange conduit between the inlet and the outlet. The inlet is configured to couple to a bleed system of a gas turbine system to extract a bleed flow. The heat exchanger is configured to cool the bleed flow along the heat exchange conduit in a surrounding air to produce a cooled bleed flow. The outlet is configured to couple to a fuel purge system of the gas turbine system to supply the cooled bleed flow as a fuel purge flow. The fan is configured to force an airflow from the surrounding air through the heat exchanger. The mount is configured to mount the air cooling system outside of an enclosure surrounding the gas turbine system.

20 Claims, 6 Drawing Sheets

(51) Int. Cl.
*F02C 7/18* (2006.01)
*F02C 7/232* (2006.01)

(58) Field of Classification Search
CPC ........ F02C 6/08; F23K 2300/203; F23K 5/18;
F02M 55/00; F02M 55/007; F01D 25/28;
F01D 25/285
See application file for complete search history.

(56) References Cited

U.S. PATENT DOCUMENTS

| | | | |
|---|---|---|---|
| 5,255,505 A | 10/1993 | Cloyd et al. | |
| 5,269,133 A | 12/1993 | Wallace | |
| 5,697,208 A | 12/1997 | Glezer et al. | |
| 6,438,963 B1 | 8/2002 | Traver et al. | |
| 6,584,778 B1 | 7/2003 | Griffiths et al. | |
| 6,907,738 B1 * | 6/2005 | Berkeley | F23C 7/008 60/785 |
| 9,091,215 B2 * | 7/2015 | Baten | F24F 7/08 |
| 9,470,460 B2 * | 10/2016 | Stimus | F28F 9/007 |
| 9,650,955 B2 | 5/2017 | Sabelhaus et al. | |
| 10,641,171 B2 * | 5/2020 | Drezek | F02C 7/32 |
| 10,876,658 B2 * | 12/2020 | Sixsmith | F16L 3/18 |
| 2001/0004828 A1 | 6/2001 | Nakamoto | |
| 2008/0202092 A1 | 8/2008 | Eluripati et al. | |
| 2012/0006034 A1 | 1/2012 | Norris et al. | |
| 2013/0005237 A1 | 1/2013 | Baten et al. | |
| 2018/0258859 A1 | 9/2018 | Suciu et al. | |
| 2021/0317784 A1 | 10/2021 | Yerram et al. | |

* cited by examiner

SYSTEM AND METHOD FOR AIR COOLING FUEL PURGE FLOW

BACKGROUND

The subject matter disclosed herein relates to a gas turbine system and, more particularly, a system and method for cooling a fuel purge flow.

A gas turbine system includes a compressor, a combustor, and a turbine. The compressor compresses an intake air in one or more stages to produce a compressed air. The combustor mixes the compressed air with fuel and combusts the fuel with the compressed air to generate hot combustion gases. The turbine directs the hot combustion gases through one or more turbine stages to drive rotation of a shaft, which may be coupled to the compressor and a load. In certain situations, a fuel system may be purged by a fuel purge flow. However, if a temperature of the fuel purge flow is too high, then the fuel purge flow can create problems such as coking. In a mobile gas turbine system, such as a trailer mounted gas turbine system having a generator driven by a turbine, it may be difficult to provide suitable cooling for the fuel purge flow. For example, the mobile gas turbine system may not be able to use water for cooling the fuel purge flow due limitations at a particular site. Accordingly, a need exists for cooling a fuel purge flow using resources available at various sites, such that the mobile gas turbine system can operate in a more flexible manner.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In certain embodiments, a system includes an air cooling system having a heat exchanger, a fan, and a mount. The heat exchanger includes an inlet, an outlet, and a heat exchange conduit between the inlet and the outlet. The inlet is configured to couple to a bleed system of a gas turbine system to extract a bleed flow. The heat exchanger is configured to cool the bleed flow along the heat exchange conduit in a surrounding air to produce a cooled bleed flow. The outlet is configured to couple to a fuel purge system of the gas turbine system to supply the cooled bleed flow as a fuel purge flow. The fan is configured to force an airflow from the surrounding air through the heat exchanger. The mount is configured to mount the air cooling system outside of an enclosure surrounding the gas turbine system.

In certain embodiments, a method includes intaking, into an inlet of a heat exchanger of an air cooling system, a bleed flow extracted from a bleed system of a gas turbine system. The method further includes cooling, along a heat exchange conduit of the heat exchanger in a surrounding air, the bleed flow to produce a cooled bleed flow. The method further includes supplying, out of an outlet of the heat exchanger, the cooled bleed flow as a fuel purge flow into a fuel purge system of the gas turbine system. The method further includes forcing, via a fan of the air cooling system, an air flow from the surrounding air through the heat exchanger, wherein the air cooling system includes a mount configured to mount the air cooling system outside of an enclosure surrounding the gas turbine system.

In certain embodiments, a method includes mounting, via a mount, an air cooling system outside of an enclosure surrounding a gas turbine system. The air cooling system includes a heat exchanger having an inlet, an outlet, and a heat exchange conduit between the inlet and the outlet. The inlet is configured to couple to a bleed system of the gas turbine system to extract a bleed flow. The heat exchanger is configured to cool the bleed flow along the heat exchange conduit in a surrounding air to produce a cooled bleed flow. The outlet is configured to couple to a fuel purge system of the gas turbine system to supply the cooled bleed flow as a fuel purge flow. The air cooling system also includes a fan configured to force an airflow from the surrounding air through the heat exchanger.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As discussed in further detail below, a fuel purge system may be used to purge a fuel, such as a gas fuel or liquid fuel, from a fuel supply system of a gas turbine system. The fuel purge system may route a fuel purge flow through various fuel conduits, manifolds, valves, and equipment within an enclosure surrounding the gas turbine system. In certain embodiments, the fuel purge flow may be extracted from a compressor via a bleed system (e.g., a bleed flow comprising compressed air), and subsequently cooled by an air cooling system rather than relying on water cooling. The air cooling system may be mounted outside of the enclosure in close proximity to the fuel supply system, the fuel purge system, and/or the bleed system. The position of the air cooling system outside of the enclosure helps to transfer heat away from the gas turbine system, taking advantage of the ambient air surrounding the enclosure. The position of the air cooling system in close proximity to the fuel supply system, the fuel purge system, and/or the bleed system helps to reduce the length of the conduits leading to and from the air cooling system, thereby helping to substantially reduce or minimize the pressure drop associated with the air cooling system. As a result, the air cooling system is configured to cool the fuel purge flow using ambient air, while reducing a pressure drop associated with passage of the fuel purge flow through the air cooling system. Details of the bleed system, the fuel purge system, and the air cooling system are discussed in further detail below with reference to FIGS. 1-6.

Figure 1:
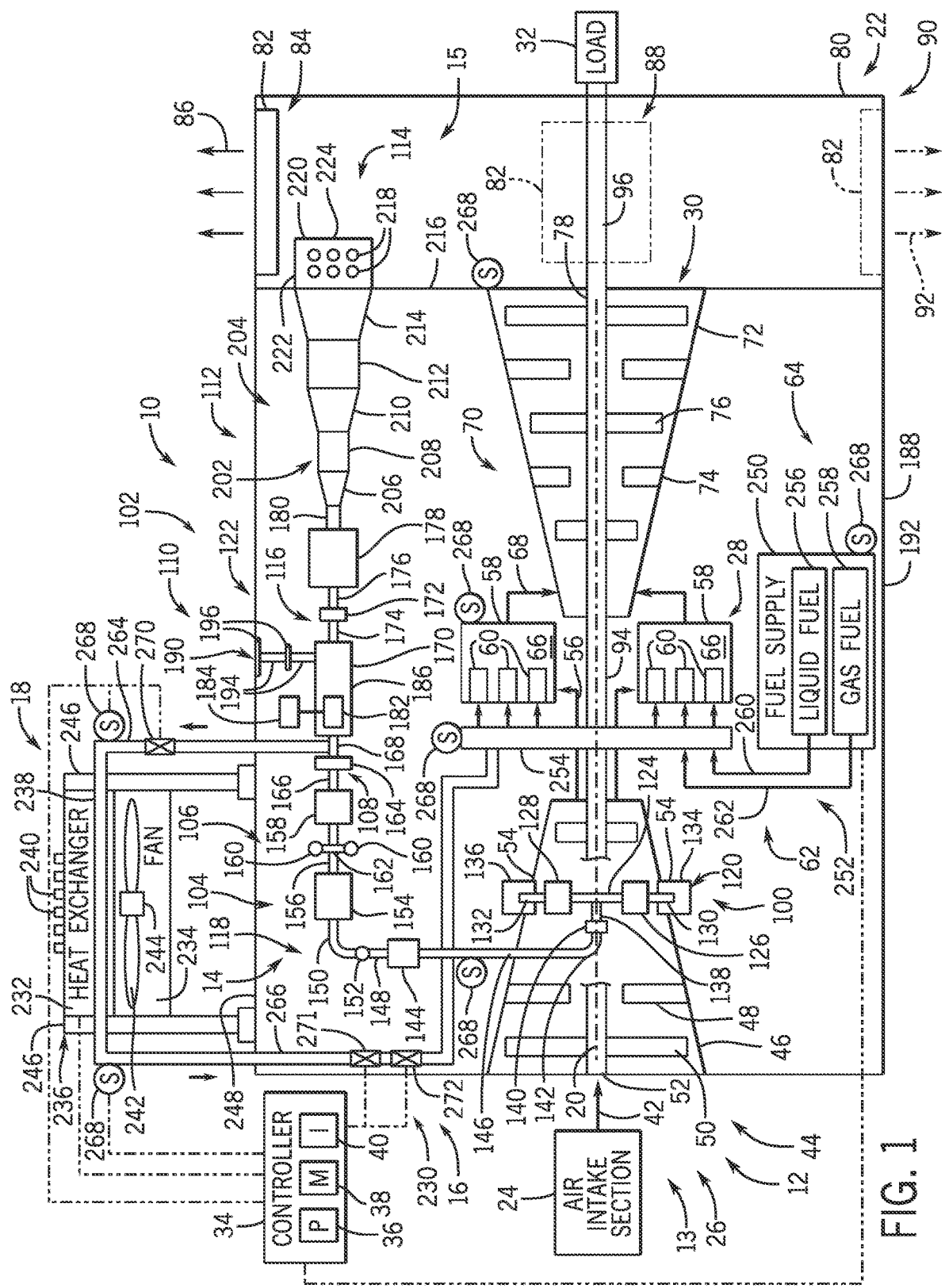
FIG. 1 is a schematic diagram of an embodiment of a gas turbine system having a fuel purge system with an air cooling system coupled to a bleed system.

FIG. 1 is a block diagram of an embodiment of a gas turbine system 10 having a gas turbine engine 12, a bleed system 14, a fuel purge system 16, and an air cooling system 18. As discussed in further detail below, the bleed system 14 is configured to extract a bleed flow (e.g., a compressed air flow), the fuel purge system 16 is configured to purge one or more fuel lines with the bleed flow, and the air cooling system 18 is configured to cool the bleed flow being used by the fuel purge system 16. The bleed system 14 is configured to route the bleed flow along a central axis 20 of the gas turbine system 10 between a high pressure region 13 and a low pressure region 15 of the gas turbine system 10. The air cooling system 18 is configured to cool the bleed flow by transferring heat from the bleed flow to a surrounding environment, e.g., air to air cooling. The fuel purge system 16 may be configured to route the bleed flow, after cooling by the air cooling system 18, through gas fuel lines during operation of the gas turbine system 12 with liquid fuel, or through one set of fuel lines during operation of the gas turbine system 12 using another set of fuel lines. Embodiments of the fuel purge system 16 and the air cooling system 18 are described in further detail below.

The gas turbine engine 12 includes an exhaust section 22, an air intake section 24, a compressor section 26, a combustion section 28, a turbine section 30, and a load 32, such as an electrical generator. The gas turbine engine 12 also may include one or more controllers 34 having one or more processors 36, memory 38, and instructions 40 stored on the memory 38 and executable by processors 36 to perform various control functions of the gas turbine system 10 and the bleed system 14. For example, the controller 34 may be configured to control one or more valves of the bleed system 14 to control a bleed flow between the high and low pressure regions 13 and 15, one or more valves of the fuel purge system 16 to control a fuel purge flow (e.g., a portion of the bleed flow extracted from the bleed system 14), and one or more components (e.g., fans, valves, etc.) of the air cooling system 18 to control a temperature and flowrate of the fuel purge flow. The air intake section 24 may include one or more air filters, fluid injection systems (e.g., heated fluids and/or cooled fluids), anti-icing systems, silencer baffles, or any combination thereof. The air intake section 24 routes an air flow 42 into one or more compressor stages 44 of a compressor section 26.

The compressor section 26 includes a compressor casing 46, one or more vanes 48 extending inwardly from the compressor casing 46 in each of the compressor stages 44, one or more blades 50 extending outwardly from a shaft 52 in each of the compressor stages 44, and connections 54 with the bleed system 14. The shaft 52 is configured to rotate a plurality of circumferentially spaced blades 50 in each of the compressor stages 44, while a plurality of circumferentially spaced vanes 48 remain stationary in each of the compressor stages 44. The connections 54 may include fluid conduit connections with the bleed system 14, such as connections 54 at one or more of the compressor stages 44. The connections 54 may be disposed on opposite sides (e.g., diametrically opposite sides) of the compressor casing 46, or in any suitable location on the compressor casing 46. The compressor section 26 outputs a compressed air flow 56 into one or more combustors 58 of the combustion section 28.

Each combustor 58 includes one or more fuel nozzles 60, which are configured to route the compressed air 56 and fuel 62 from a fuel supply system 64 into a combustion chamber 66 of the combustor 58. The fuel 62 and the compressed air 56 mix and combust within the combustion chamber 66, thereby producing hot combustion gases 68 that are routed into the turbine section 30. In certain embodiments, the combustion section 28 has a single annular combustor 58 disposed circumferentially about a central axis of the gas turbine system 10. However, in some embodiments, the combustion section 28 includes a plurality of combustors 58 (e.g., combustor cans) spaced circumferentially about the central axis of the gas turbine system 10. The fuel nozzles 60 may include 1, 2, 3, 4, 5, 6, or more fuel nozzles, which may be configured to operate on a plurality of fuel circuits. As discussed below, the fuel circuits may be designed to deliver the same fuel or different fuels, such as liquid and gas fuels. The gas turbine system 10 may be configured to switch between the different fuels using the different fuel circuits. When switching between fuels and fuel circuits, the fuel purge system 16 may be configured to circulate the fuel purge flow through the unused fuel circuits to block any backflow, reduce the possibility of coking, and generally protect the unused fuel circuits. The air cooling system 18 is configured to cool the fuel purge flow using the environmental air, rather than using a supply of water for cooling. Regardless, once the fuel combusts, the hot combustion gases 68 are used to drive the turbine section 30.

The turbine section 30 includes a plurality of turbine stages 70 configured to gradually expand the hot combustion gases 68 and drive components of the gas turbine system 10. The turbine section 30 includes a turbine casing 72, one or more turbine vanes 74 extending inwardly from the turbine casing 72 in each of the turbine stages 70, and one or more turbine blades 76 extending outwardly from a turbine shaft 78 in each of the one or more turbine stages 70. The turbine shaft 78 is driven to rotate by the hot combustion gases 68 flowing against a plurality of circumferentially spaced turbine blades 76 in each of the turbine stages 70, while a plurality of circumferentially spaced turbine vanes 74 remain stationary in each of the turbine stages 70. The hot combustion gases 68 expand through the turbine section 30 while driving rotation of the turbine blades 76 and turbine shaft 78 and then discharge through the exhaust section 22.

The exhaust section 22 includes an exhaust plenum 80 disposed downstream from the turbine section 30, and the exhaust plenum 80 includes an exhaust outlet 82. The exhaust outlet 82 may be positioned in a variety of exhaust outlet orientations depending on the particular configuration of the gas turbine system 10. In the illustrated embodiment, the exhaust outlet 82 is arranged in a right-hand orientation or configuration 84 on a right-hand side of the exhaust plenum 80 (when viewed from an aft end of the gas turbine system 10), thereby directing an exhaust flow in a right hand direction as indicated by arrows 86. However, the exhaust outlet 82 may be arranged in other configurations (shown in phantom lines in FIG. 1), such as a top orientation or configuration 88 to direct a vertical flow of the exhaust gas, or a left-hand orientation or configuration 90 configured to direct the exhaust flow in a left-hand direction as indicated by arrows 92.

In operation, the gas turbine engine 12 receives air through the air intake section 24, compresses the air in one or more compressor stages 44 via rotation of a plurality of compressor blades 50 in each of the compressor stages 44, and then routes the compressed air 56 into one or more combustors 58 of the combustion section 28. The combustors 58 combust the fuel 62 with the compressed air 56 via injection through the fuel nozzles 60 and combustion within the combustion chamber 66, and then route the hot combustion gases 68 into one or more turbine stages 70. The turbine stages 70 use the energy of the hot combustion gases 68 to drive a plurality of turbine blades 76 in each of the turbine stages 70, thereby driving rotation of the turbine shaft 78. In turn, the turbine shaft 78 drives rotation of a common shaft 94 between the turbine section 30 and the compression section 26, thereby driving the shaft 52 of the compressor section 26. The rotation of the turbine shaft 78 also drives rotation of a shaft 96 coupled to the load 32, which may be an electrical generator to generate electricity for a local facility or the power grid. In operation, the controller 34 is configured to control a fuel flow from the fuel supply system 64, a bleed flow through the bleed system 14, a fuel purge flow from the bleed system 14 through the air cooling system 18, the fuel purge flow from the air cooling system 18 through the fuel purge system 16, and other aspects of the gas turbine system 10.

The bleed system 14 is configured to route a compressed air stream from the high pressure region 13, which may include the compressor section 26, to the low pressure region 15, which may include the exhaust plenum 80 of the exhaust section 22. However, the bleed system 14 may be used between other high and low pressure regions of the gas turbine system 10. In the illustrated embodiment, the bleed system 14 includes a first bleed conduit section 100 fluidly coupled to the compressor section 26 via the connections 54, and a second bleed conduit section 102 movably (e.g., rotatably) coupled to the first bleed conduit section 100 and movably coupled to the exhaust section 22. The first and second bleed conduit sections 100 and 102 may include a plurality of flexible and/or movable structures, which are configured to provide freedom of movement in one or more directions (e.g., rotational direction, horizontal direction, and/or vertical direction). The flexible and/or movable structures may include, for example, one or more gimbals 104, one or more spring hangers 106, one or more flexible conduits or hoses, and one or more rotatable joints 108. The flexible and/or movable structures (e.g., 104, 106, and 108) may be configured to enable freedom of movement to accommodate thermal expansion and contraction in the bleed system 14 and between components of the gas turbine system 10. Additionally, the first and second bleed conduit sections 100 and 102 may include one or more mounting brackets 110, a staged expansion conduit 112, an outlet section 114, one or more straight conduits 116 between the various components, and one or more bending conduits or elbows 118 between the various components.

As discussed in further detail below, the first bleed conduit section 100 may have a U-shaped conduit configuration 120 configured to partially extend around opposite sides of the compressor section 26 before fluidly connecting with the internal fluid flow through the compressor section 26 via the connections 54. The U-shaped conduit configuration 120 of the first bleed conduit section 100 includes a central straight section or straight conduit 124 generally centered and oriented crosswise relative to the central axis 20, gimbals 126 and 128 coupled to opposite ends of the straight conduit 124, bending conduits or elbows 130 and 132 coupled to the respective gimbals 126 and 128, gimbals 134 and 136 coupled to the respective bending conduits or elbows 130 and 132, and the connections 54 between the gimbals 134 and 136 and the compressor casing 46 of the compressor section 26. In the illustrated embodiment, the U-shaped conduit configuration 120 may remain in a fixed orientation once mounted to the compressor casing 46, while a J-shaped conduit configuration 122 of the second bleed conduit section 102 may be reoriented or rotated about the central axis 20 to accommodate the different configurations 84, 88, and 90 of the exhaust outlet 82.

The J-shaped conduit configuration 122 of the second bleed conduit section 102 extends from the first bleed conduit section 100 and turns toward and connects with the exhaust plenum 80 of the exhaust section 22 at the staged expansion conduit 112 and the outlet section 114. The J-shaped conduit configuration 122 of the second bleed conduit section 102 includes a straight conduit 138 coupled to the central straight conduit 124 in a generally crosswise orientation along the central axis 20 and a rotational joint 140 coupled to the straight conduit 138. The J-shaped conduit configuration 122 also includes a bending conduit or elbow 142 coupled to the rotational joint 140, a gimbal 144 coupled to the bending conduit or elbow 142 via an intermediate straight conduit 146, and a straight conduit 148 coupled to the gimbal 144 opposite the intermediate straight conduit 146. The J-shaped conduit configuration 122 also includes a bending conduit or elbow 150 coupled to the straight conduit 148, one or more spring hangers 152 coupled to one or both of the conduits 148 and 150, and a gimbal 154 coupled to the bending conduit or elbow 150. The J-shaped conduit configuration 122 also includes a straight conduit 156 coupled to (and extending between) the gimbal 154 and a gimbal 158 and a plurality of spring hangers 160 coupled to the straight conduit 156 via an intermediate bracket 162. The J-shaped conduit configuration 122 also includes a rotatable joint 164 removably coupled between a straight conduit 166 coupled to the gimbal 158 and a straight conduit 168 coupled to a valve assembly 170. The J-shaped conduit configuration 122 also includes a rotatable joint 172 removably coupled between a straight conduit 174 coupled to the valve assembly 170 and a straight conduit 176 coupled to a gimbal 178. The J-shaped conduit configuration 122 also includes a straight conduit 180 coupled to the gimbal 178 opposite the straight conduit 176, and the staged expansion conduit 112 is coupled to the straight conduit 180 and extends to the outlet section 114 in the exhaust section 22.

The valve assembly 170 may include one or more valves 182 driven by an actuator 184, which is communicatively coupled to and controlled by the controller 34. For example, the valve 182 may include a gate valve, a ball valve, a flapper valve, or any combination thereof. The actuator 184 may include an electric drive or motor, a solenoid, a pneumatic drive, a hydraulic drive, or any combination thereof. Accordingly, the controller 34 may control the actuator 184 to open and close the valve 182, thereby controlling a bleed flow through the bleed system 14, including the bleed flow through both the first and second conduit sections 100 and 102 between the high pressure region 13 in the compressor section 26 and the low pressure region 15 in the exhaust section 22. The valve assembly 170 also may include a protective shield, a tray to collect fluid spills or leaks, and/or a wall structure 186 at least partially or entirely extending around the valve 182 and/or the actuator 184.

The shield 186 of the valve assembly 170 also may be coupled to an enclosure 188 of the gas turbine engine 12 via a mounting bracket 190. In certain embodiments, the mounting bracket 190 may extend between and couple with the enclosure 188 and the valve assembly 170, the straight conduit 168, the straight conduit 174, and/or some other portion of the second bleed conduit section 102. The enclosure 188 may substantially or completely surround the compressor section 26, the combustion section 28, and the turbine section 30, of the gas turbine engine 12, and the mounting bracket 190 may rigidly support the valve assembly 170 and the second bleed conduit section 102 relative to a sidewall 192 of the enclosure 188. The mounting bracket 190 may include a plurality of bracket sections 194 coupled together with intermediate flanges 196. For example, the flanges 196 may be bolted together with a plurality of threaded fasteners, such as threaded bolts and nuts.

As further illustrated in FIG. 1, the staged expansion conduit 112 includes a plurality of alternating constant-diameter conduits 202 and expanding-diameter conduits 204, thereby defining a plurality of stages of expansion and depressurization. In particular, the illustrated staged expansion conduit 112 includes, in series, an expanding conduit 206, a constant conduit 208, an expanding conduit 210, a constant conduit 212, and an expanding conduit 214. The conduits 206, 208, 210, 212, and 214 progressively increase in diameter and cross-sectional area, wherein each constant conduit 208 and 212 has a constant diameter and cross-sectional area, and each expanding conduit 206, 210, and 214 has a gradually increasing diameter and cross-sectional area in a direction of bleed flow. The expanding conduit 214 is coupled to an end wall 216 of the exhaust section 122 between the enclosure 188 and the exhaust plenum 80. The expanding conduit 214 also leads into the outlet section 114, which is disposed inside of the exhaust plenum 80. At a connection between the staged expansion conduit 112 and the end wall 216, the bleed system 14 may enable freedom of movement in one or more directions, such axial, radial, and/or rotational directions of movement relative to the end wall 216. The outlet section 114 includes a plurality of outlets 218 disposed in an annular housing 220, wherein the outlets 218 are configured to distribute or diffuse the bleed flow from the bleed system 14 into the exhaust plenum 80. For example, the outlets 218 may be disposed along a sidewall 222 (e.g., annular sidewall) and an end wall 224 (e.g., axially facing end wall) of the annular housing 220. In certain embodiments, the connection between the end wall 216 and the staged expansion conduit 112 and/or the outlet section 114 may include a moveable joint configured to enable axial movement and/or rotation therebetween.

The staged expansion conduit 112 is configured to gradually depressurize the bleed flow to reduce the vibration and/or noise of the bleed system 14, such as vibration of a bleed valve. The staged expansion conduit 112 may have at least two stages configured to gradually (e.g., incrementally) depressurize the bleed flow. Each stage of the staged expansion conduit 112 may have an expansion section and/or a diffuser plate. The number of stages may be determined at least in part on the difference in pressure between the high pressure region 13 and the low pressure region 15. More stages may be used for large pressure differences than for small pressure differences. The expansion sections increase the dimension of the staged expansion conduit 112 to at least reduce the static pressure of the bleed flow. The diffuser plates partially obstruct the bleed flow and permit passage of the bleed flow through orifices. The diffuser plates are configured to at least reduce the kinetic energy or dynamic pressure of the bleed flow. The characteristics of the expansion sections (e.g., expansion percentage, size, cross-sectional shape, length) and diffuser plates (e.g., orifice size, orifice quantity, orifice shape, orifice configuration, diffuser plate size) affect the vibration of the bleed system 14.

Vibration and thermal expansion/contraction of the bleed system 14 may cause the bleed system 14 to move. Certain mounting and coupling features may be utilized to accommodate the movements of the bleed system 14. For example, the various components of the bleed system 14 may be configured to allow for movement in one or more directions, such as an axial direction along an axis of the conduit, rotationally about the axis of the conduit, in a horizontal direction, a vertical direction, or any combination thereof. Each gimbal 104 may be configured to allow for axial movement, rotational movement, or any combination thereof, relative to an axis of the adjacent conduits. The rotatable joints 108 are configured to enable rotation about an axis of the adjacent conduits. The rotatable joints 108 also may be configured to enable separation and reattachment of the adjacent conduits. The spring hangers 106 are configured to enable movement along an axis of the spring portion of the spring hangers, which may be oriented in a vertical direction, a horizontal direction, or any other suitable angular direction between horizontal and vertical within the enclosure 188 of the gas turbine engine 12. For example, each of the spring hangers 106 may be hung from a top wall or ceiling of the enclosure 188, thereby allowing some vertical movement of the various conduits and sections of the bleed system 14.

The fuel purge system 16 includes a fuel purge circuit 230 fluidly coupling the bleed system 14, the air cooling system 18, and the fuel supply system 64. The air cooling system 18 includes one or more heat exchangers 232, one or more fans 234, and a support structure or mount 236 (e.g., a mounting framework). The one or more heat exchangers 232 include one or more heat exchange conduits 238 and a plurality of fins 240 coupled to the heat exchange conduits 238. The one or more fans 234 include a plurality of fan blades 242 coupled to an electric motor 244, which is communicatively coupled to and controlled by the controller 34. The mount 236 may include a plurality of frame members or legs 246 disposed about and coupled to the heat exchanger 232 and the fan 234, wherein the mount 236 is configured to mount the heat exchanger 232 and the fan 234 outside of the enclosure 188 in the surrounding environment (e.g., ambient air). For example, the mount 236 may be configured to mount the heat exchanger 232 and the fan 234 to the sidewall 192 and/or a top wall 248 of the enclosure 188. In certain embodiments, the mount 236 may be configured to mount the heat exchanger 232 and the fan 234 adjacent the enclosure 188 on a common trailer or mobile unit carrying the gas turbine system 10, such as on a trailer bed of the common trailer or an adjacent component mounted on the common trailer. However, regardless of the specific external mounting location, the mount 236 is configured to mount the heat exchanger 232 and the fan 234 in close proximity to the bleed system 14, the fuel purge system 16, and the fuel supply system 64, thereby helping to reduce the amount of pressure drop through the fuel purge system 16 and reduce the heat transfer from within the enclosure 188 (e.g., due to heat generated by the gas turbine system 10) into the bleed flow in the bleed system 14 and the fuel purge flow in the fuel purge system 16.

The fuel purge circuit 230 may be coupled to the fuel supply system 64 at one or more locations. The fuel supply system 64 may include a fuel supply 250, one or more fuel circuits 252 coupled to the fuel supply 250, and one or more fuel manifolds 254 coupled to the fuel circuits 252 and the fuel nozzles 60 in the combustors 58. The fuel supply 250 may include one or more liquid fuel supplies 256 and one or more gas fuel supplies 258. The fuel supplies 256 and 258 may include fuel tanks, fuel pumps, fuel lines or conduits, fuel pipelines, fuel compressors, pressure regulators, fuel treatment units (e.g., filters, water removal units, etc.), or any combination thereof. The fuel circuits 252 may include one or more liquid fuel circuits 260 extending between the liquid fuel supplies 256 and the fuel manifolds 254, and one or more gas fuel circuits 262 extending between the gas fuel supplies 258 and the fuel manifolds 254. The fuel circuits 252 (e.g., 260 and 262) may include fuel conduits, fuel valves, and other fuel distribution and flow control components. The fuel manifolds 254 may include separate liquid and gas fuel manifolds coupled to the respective liquid and gas fuel circuits 260 and 262, or the fuel manifolds 254 may include one or more common fuel manifolds coupled to both the liquid and gas fuel circuits 260 and 262. In certain embodiments, the fuel circuit 252 (e.g., 260 and 262) may include the fuel flow paths in the fuel supply 250, the fuel manifolds 254, and the fuel nozzles 60, thereby encompassing the fuel flow paths up until fuel injection into the combustion chamber 66 of the combustor 58.

The fuel purge circuit 230 is shown coupled to the fuel manifolds 254. However, the fuel purge circuit 230 may be coupled to the fuel supply system 64 at any one or more locations along the fuel circuit 252 (e.g., 260 and 262), such as at the fuel nozzles 60, the fuel manifolds 254, the fuel supply 250, or any location between these components 60, 254, and 250. The fuel purge circuit 230 may include a plurality of circuit portions (e.g., fuel purge conduits), such and circuit portions 264 and 266 disposed upstream and downstream of the air cooling system 18. For example, the circuit portion 264 extends between and couples to the bleed system 14 and the heat exchange conduit 238 of the heat exchanger 232, and the circuit portion 266 extends between and couples to the heat exchange conduit 238 of the heat exchanger 232 and the fuel supply system 64. In the illustrated embodiment, the circuit portion 264 couples to the straight conduit 168 of the bleed system 14; however, the circuit portion 264 may couple to the bleed system 14 at or between any of the numbered components of the bleed system 14. Additionally, in the illustrated embodiment, the circuit portion 266 couples to the fuel manifold 254 of the fuel supply system 64; however, the circuit portion 266 may couple to any one or more components of the fuel supply system 64 (e.g., the fuel nozzles 60, the fuel manifolds 254, the fuel circuit 252, or the fuel supplies 250). For example, the circuit portion 266 may couple to the fuel supply system 64 along a liquid fuel passage from the liquid fuel supply 256 to the fuel nozzles 60, a gas fuel passage from the gas fuel supply 258 to the fuel nozzles 60, or a combination thereof.

In certain embodiments, the circuit portion 266 may selectively provide a fuel purge flow to: only the liquid fuel passage, only the gas fuel passage, or both the liquid and gas fuel passages. When operating the gas turbine system 10 with liquid fuel, the circuit portion 266 may provide the fuel purge flow to the gas fuel passage. When operating the gas turbine system 10 with gas fuel, the circuit portion 266 may provide the fuel purge flow to the liquid fuel passage. Accordingly, embodiments of the fuel purge system 16 include various valves (e.g., 270, 271, and/or 272) and controls to change the flow path of the fuel purge flow depending on various operational conditions.

The controller 34 may be programmed to control operation of the bleed system 14, the fuel purge system 16, and the air cooling system 18 in response to sensor feedback from a plurality of sensors 268, designed by S. For example, the controller 34 may be communicatively coupled to the sensors 268 at one or more components along the bleed system 14, one or more components along the fuel purge system 16 (e.g., circuit portions 264 and 266), one or more components along the air cooling system 18 (e.g., heat exchange conduit 238 and/or fan 234), and one or more components along the fuel supply system 64 (e.g., fuel supply 250, fuel circuit 252, and fuel manifold 254). The sensors 268 may be configured to monitor one or more parameters, such as temperature, pressure, flow rate, or any combination thereof. In the illustrated embodiment, the plurality of sensors 268 include sensors disposed along the circuit portion 264 between the bleed system 14 and the heat exchange conduit 238, and sensors along the circuit portion 266 between the heat exchange conduit 238 and the fuel supply system 64. The sensors 268 may be configured to monitor temperature, flow rate, pressure, or any combination thereof, of the fuel purge flow.

The controller 34 also may be configured to monitor other sensor feedback and operational parameters of the gas turbine system 10 when controlling the bleed system 14, the fuel purge system 16, and the air cooling system 18. For example, the sensors 268 may be configured to monitor the surrounding environment outside of the enclosure 188 (e.g., temperature of exterior ambient air), the space surrounding the gas turbine system 10 inside of the enclosure 188 (e.g., temperature of interior air), the temperature of the fuel supply system 64 (e.g., temperature of the fuel circuit 252), or any combination thereof. The controller 34 also may monitor sensors 268 coupled to the fuel nozzles 60, the combustors 58, the turbine section 30, the exhaust section 22, or any combination thereof. The controller 34 also may monitor operational modes of the gas turbine system 10, such as a startup mode, a steady state mode, a shutdown mode, a part load mode, a full load mode, or any combination thereof. The controller 34 may be configured to adjust and/or change the fuel purge flow in response to any of the foregoing sensor feedback and monitored parameters.

The controller 34 is configured to process the sensor feedback from the sensors 268 and control one or more valves (e.g., valve 182) of the bleed system 14, one or more valves of the fuel purge circuit 230 (e.g., valve 270 along circuit portion 264 and valves 271 and/or 272 along circuit portion 266), and one or more valves along the fuel supply system 64 (e.g., valves along the fuel circuit 252). For example, the controller 34 may be configured to adjust the valves 270, 271, and/or 272 to control the flow rate of the fuel purge flow extracted from the bleed system 14 and routed through the heat exchanger 232 of the air cooling system 18, and the controller 34 may be configured to control the fan speed of the fan 234. As appreciated, a lower flow rate of the fuel purge flow and a higher fan speed of the fan 234 may increase the cooling performance of the air cooling system 18 to reduce the temperature of the fuel purge flow, while a higher flow rate of the fuel purge flow and a lower fan speed of the fan 234 may decrease the cooling performance of the air cooling system 18 to increase the temperature of the fuel purge flow. Additionally, the controller 34 is configured to control one or more valves along the fuel purge circuit 230 to enable or disable the fuel purge flow through a gas fuel passage, a liquid fuel passage, or both, of the fuel supply system 64. The controller 34 also may be configured to adjust the fuel purge flow when switching between fuels, when switching between modes of operation of the gas turbine system 10 (e.g., startup mode, steady state mode, shutdown mode, part load mode, and full load mode), or any combination thereof. Embodiments of the fuel purge system 16 and the air cooling system 18 are discussed in further detail below with reference to FIGS. 2-6.

Figure 2:
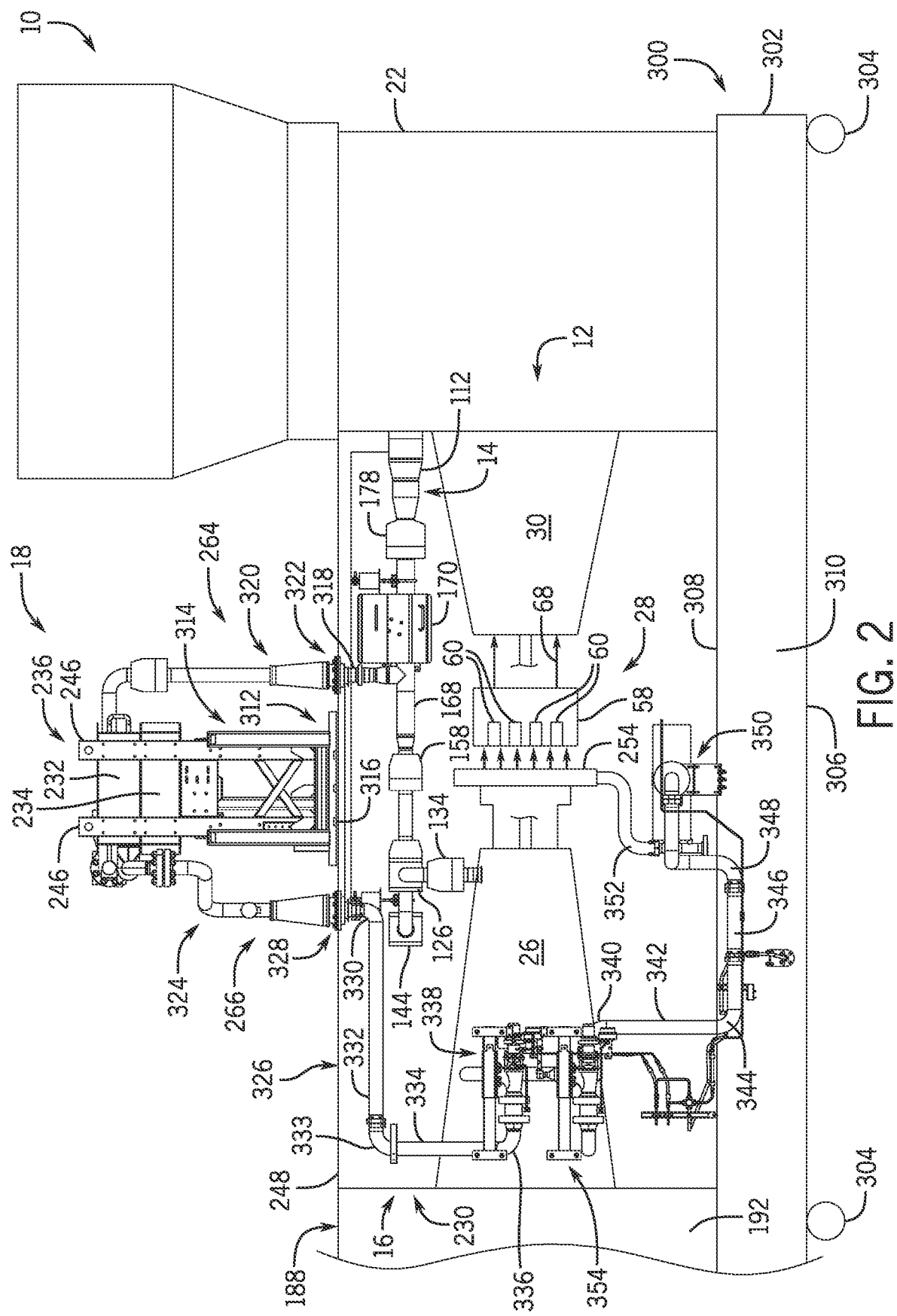
FIG. 2 is a schematic side view of an embodiment of the gas turbine system of FIG. 1, further illustrating details of the air cooling system mounted on a top wall of an enclosure of the gas turbine system, and the fuel purge system and the bleed system disposed inside of the enclosure.

FIG. 2 is a schematic side view of an embodiment of the gas turbine system 10 of FIG. 1, further illustrating details of the bleed system 14, the fuel purge system 16, and the air cooling system 18. The components of the bleed system 14, the fuel purge system 16, and the air cooling system 18 are substantially the same as discussed in detail above with reference to FIG. 1. However, additional details and components are further illustrated in FIG. 2. As illustrated, the bleed system 14 is disposed entirely inside the enclosure 188, the air cooling system 18 is disposed outside of the enclosure 188, and the fuel purge system 16 is disposed partially inside and partially outside of the enclosure 188. In particular, the bleed system 14 is disposed inside of the enclosure 188 above and/or laterally to the side of the gas turbine engine 12, such as partially above and to the side of the compressor section 26, the combustion section 28, and the turbine section 30. The air cooling system 18 is disposed generally above the bleed system 14, such that connections between the bleed system 14 and the air cooling system 18 are relatively short to minimize any pressure drop and heat transfer to the extracted bleed flow being used as the fuel purge flow. Similarly, the fuel purge system 16 is relatively close to both the air cooling system 18 and the manifold 254 of fuel supply system 64, thereby helping to minimize a pressure drop and heat transfer from the interior of the enclosure 188 into the fuel purge flow and the fuel purge system 16.

The gas turbine system 10 may be disposed on one or more mobile units or trailers 300, which may include a platform 302 having a plurality of wheels 304. One or more of the mobile units or trailers 300 may be configured to transport the gas turbine system 10 and the air cooling system 18 across the country on highways or other roads. Accordingly, the gas turbine system 10 may be a mobile power plant having the gas turbine system 10 and the air cooling system 18 disposed on one or more mobile units or trailers 300. In certain embodiments, the air cooling system 18 may be disposed on a different mobile unit or trailer 300 than the gas turbine system 10 during transportation, wherein the air cooling system 18 is subsequently mounted on the top wall 248 of the enclosure 188 at a desired site while setting up the gas turbine system 10 for operation (e.g., power generation). The platform 302 may include a base panel 306, a walking panel or floor 308 above the base panel 306, and a floor cavity 310 disposed between the base panel 306 and the floor 308. The floor 308 enables a technician or operator to walk inside the enclosure 188 to inspect, control, service, or perform other functions on the gas turbine system 10.

The air cooling system 18 is disposed outside of the enclosure 188, such that the heat exchanger 232 and the fan 234 are configured to provide cooling by exchanging heat with a surrounding environment. In the illustrated embodiment, the air cooling system 18 has the heat exchanger 232 and the fan 234 supported by the mount 236, which is coupled to the top wall 248 of the enclosure 188 directly above a portion of the bleed system 14. However, in certain embodiments, the mount 236 may support the fan 234 and the heat exchanger 232 on one of the sidewalls 192, on the floor 308 of the trailer 300, or on another component disposed on the floor 308 of the trailer 300.

The mount 236 may include a skid 312 having a framework 314 coupled to a base 316. The base 316 of the skid 312 is configured to mount on the top wall 248, while the framework 314 extends upwardly from the base 316 to support the heat exchanger 232, the fan 234, and various piping and other equipment. The base 316 of the skid 312 may be coupled to the top wall 248 of the enclosure 188 via one or more fixed connections and/or removable connections, such as a plurality of threaded fasteners, clamps, ties, or any combination thereof.

The air cooling system 18 may include portions of the fuel purge circuit 230, such as conduit portions of the circuit portions 264 and 266. For example, the circuit portion 264 may include a branch conduit 318 disposed inside of the enclosure 188 and an inlet conduit 320 disposed outside of the enclosure 188. The branch conduit 318 couples to and branches off from the bleed system 14, such as at a location along the straight conduit 168 between the gimbal 158 and the valve assembly 170 of the bleed system 14. The branch conduit 318 extends directly from the bleed system 14 to the top wall 248, where the inlet conduit 320 couples with the branch conduit 318 at a flange coupling 322. The branch conduit 318 may be a straight conduit to help minimize a pressure drop between the bleed system 14 and the air cooling system 18. The branch conduit 318 and the inlet conduit 320 may be coupled together at the flange coupling 322 via a plurality of joints or fasteners, such as threaded fasteners or bolts, welded joints, clamps, ties, or any combination thereof. The inlet conduit 320 extends upwardly away from the top wall 248 and turns into the heat exchanger 232 to connect with the heat exchange conduits 238 as discussed above with reference to FIG. 1. In certain embodiments, the air cooling system 18 may include the inlet conduit 320 and the flange coupling 322 at least partially supported by the mount 236, e.g., coupled to and supported by the framework 314 on the skid 312.

The circuit portion 266 has an outlet conduit 324 disposed outside of the enclosure 188 and a purge conduit 326 disposed inside of the enclosure 188. Similar to the conduits 318 and 320, the outlet conduit 324 and the purge conduit 326 may be coupled together at a flange coupling 328, which may be disposed along the top wall 248. In certain embodiments, the outlet conduit 324 and/or the purge conduit 326 may include or exclude insulation (e.g., one or more layers of exterior insulation). For example, while the insulation may help to reduce heat transfer into the conduits 324 and 326, the conduits 324 and 326 may be sized sufficiently short as to minimize (or avoid any significant) heat transfer into the conduits 324 and 326. The outlet conduit 324 may extend from the heat exchange conduit 238 of the heat exchanger 232 downwardly to the flange coupling 328 at the top wall 248 of the enclosure 188. The flange coupling 328 may include flanges coupled together with a plurality of joints or fasteners, such as threaded fasteners or bolts, ties, clamps, welded joints, or a combination thereof. In certain embodiments, the air cooling system 18 may include the outlet conduit 324 and the flange coupling 328 at least partially supported by the mount 236, e.g., coupled to and supported by the framework 314 on the skid 312.

The flange couplings 322 and 328 may be disposed along the top wall 248 to provide easy access for connecting and installing the air cooling system 18. For example, the flange couplings 322 and 328 may be disposed along a common plane with the base 316 of the skid 312, or the flange couplings 322 and 328 may be slightly offset relative to the base 316 of the skid 312 (e.g., between 0 to 25, 1 to 15, or 2 to 10 centimeters vertical offset relative to the base 316). In certain embodiments, the flange couplings 322 and 328 may be disposed at least partially or entirely inside of the enclosure 188. However, the illustrated embodiment positions the flange couplings 322 and 328 partially or completely outside of the enclosure 188 to provide easy access for connecting and installing the air cooling system 18. The purge conduit 326 of the fuel purge circuit 230 extends from the flange coupling 328 at the top wall 248 to the fuel manifold 254 at the combustion section 28. The purge conduit 326 is routed through the interior of the enclosure 188 in a manner to reduce a length of the fuel purge circuit 230, such that the fuel purge circuit 230 has a relatively low pressure drop and heat transfer from within the enclosure 188 into the fuel purge flow that flows through the fuel purge conduit 326.

As illustrated, the purge conduit 326 includes an elbow 330 coupled to the flange coupling 328 at the top wall 248, a straight conduit 332 coupled to the elbow 330 and extending lengthwise along the top wall 248, an elbow 333 coupled to the straight conduit 332, a straight conduit 334 coupled to the elbow 333 and extending downwardly away from the top wall 248 toward the floor 208. For example, the straight conduit 332 may be generally parallel with the top wall 248, while the straight conduit 334 may be generally crosswise or perpendicular to the top wall 248. The purge conduit 326 also includes an elbow 336 coupled to the straight conduit 334, and one or more conduits within a valve assembly 338 coupled to the elbow 336. The valve assembly 338 may include one or more valves, such as custom or off-the-shelf valves, suitable for the pressures and temperatures associated with the gas turbine system 10. Details of the valve assembly 338 will be discussed in further detail below with reference to FIGS. 5 and 6.

Downstream of the valve assembly 338, the purge conduit 326 also includes an elbow 340 coupled to the valve assembly 338, a straight conduit 342 coupled to the elbow 340 and extending downwardly from the valve assembly 338 toward the floor 308, an elbow 344 coupled to the straight conduit 342, a straight conduit 346 coupled to the elbow 344, an elbow 348 coupled to the straight conduit 346, a flow distribution assembly 350 coupled to the elbow 348, and one or more supply conduits 352 extending between the flow distribution assembly 350 and the fuel manifold 254. The elbow 340 may turn and direct the straight conduit 342 in a crosswise or perpendicular direction relative to the top wall 248, while the elbow 344 may turn and direct the straight portion 346 substantially parallel to the top wall 248 and the floor 308. The illustrated embodiment of the purge conduit 326 also positions the elbow 344, the straight conduit 346, and the elbow 348 in the floor cavity 310 between the floor 308 and the base panel 306. The elbow 348 turns the purge conduit 326 upwardly from the floor 308 to the flow distribution assembly 350, which may include one or more manifolds, valves, elbows, straight conduit portions, or any combination of flow control equipment, to distribute a fuel purge flow from the purge conduit 326 into the fuel supply system 64, such as into the fuel manifold 254.

In some embodiments, the flow distribution assembly 350 may include fuel flow distribution, fuel purge flow distribution, diluent flow distribution, or any combination thereof. For example, the flow distribution assembly 350 may be configured to supply one or more fuels, such as the liquid fuel, a gas fuel, or any combination thereof, into the supply conduits 352 leading into the fuel manifold 254. The fuel distribution assembly 350 also may be configured to supply one or more diluents, such as steam, nitrogen, a recirculated exhaust gas, or any combination thereof, through one or more of the supply conduits 352 into the fuel manifold 254. Additionally, the flow distribution assembly 350 may be configured to distribute the fuel purge flow from the purge conduit 326 through the supply conduits 352 into the fuel manifold 254. Accordingly, the fuel purge flow from the purge conduit 326 may be configured to purge the fuel supply system 64 starting at the flow distribution assembly 350, the supply conduits 352, the fuel manifold 254, the fuel nozzles 60, or any combination thereof.

The purge conduit 326 may include one or mounting components. For example, the valve assembly 338 along the purge conduit 326 may include a wall mount 354, which is configured to mount the valve assembly 338 on one of the sidewalls 192. The purge conduit 326 also may include one or more gimbals, spring hangers, or other mounts disposed along the elbows and straight conduits of the fuel purge circuit 230. In the illustrated embodiment, the purge conduit 326 of the fuel purge circuit 230 has a relatively short length from the air cooling system 18 to the fuel supply system 64, such that the purge conduit 326 does not create a substantial pressure drop and the purge conduit 326 does not become substantially heated by the heat generated by the gas turbine engine 12.

Figure 3:
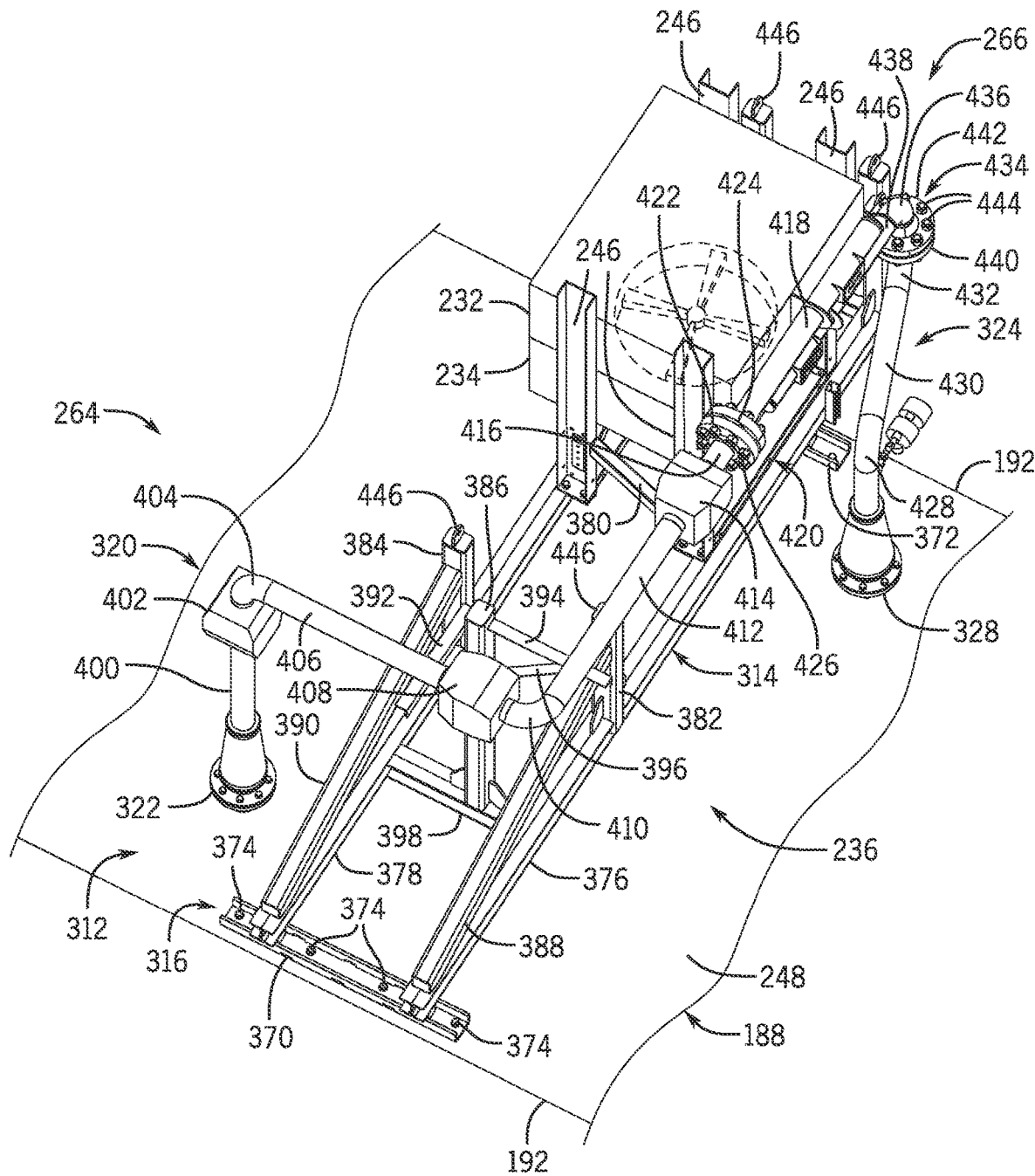
FIG. 3 is a partial perspective view of an embodiment of the gas turbine system of FIGS. 1 and 2, further illustrating the air cooling system mounted on the top wall of the enclosure.

FIG. 3 is a partial perspective view of an embodiment of the gas turbine system 10 of FIGS. 1 and 2, further illustrating details of the air cooling system 18 mounted to the top wall 248 of the enclosure 188 of the gas turbine system 10. As illustrated, the base 316 of the skid 312 includes mounting brackets 370 and 372 disposed along the top wall 248 adjacent to the opposite walls 192 of the enclosure 188. Each of the mounting brackets 370 and 372 may include a beam, a plate, an elongated C-shaped channel, or any suitable structure extending along the top wall 248. The mounting brackets 370 and 372 are removably coupled to the top wall 248 via a plurality of fasteners 374, such as threaded fasteners or bolts. However, the mounted brackets 370 and 372 may be removably coupled to the top wall 248 via clamps, ties, dovetail joints, male and female railing structures, or any combination thereof. In some embodiments, the mounting brackets 370 and 372 may be fixedly coupled to the top wall 248 via welded joints, brazed joints, or another fixed connection.

The framework 314 is disposed on top of the mounting brackets 370 and 372, wherein the framework 314 includes horizontal supports or beams 376 and 378 extending crosswise relative to the opposite sidewalls 192 and the mounting brackets 370 and 372. For example, the horizontal supports or beams 376 and 378 may be perpendicular to the mounted brackets 370 and 372, and may extend across the top wall 248 and connect with each of the mounted brackets 370 and 372. The horizontal supports or beams 376 and 378 may be fixedly or removably coupled to the mounting brackets 370 and 372. For example, the horizontal supports or beams 376 and 378 may be welded or brazed onto the mounting brackets 370 and 372, or a plurality of fasteners such as threaded bolts may be used to connect the components together.

The framework 314 further includes the legs 246 disposed about the heat exchanger 232 and the fan 234, such as four legs 246 extending vertically upward from the horizontal supports or beams 376 and 378 on opposite sides of the heat exchanger 232 and the fan 234. The legs 246 also may be supported via one or more angle supports or braces 380 on opposite sides of the heat exchanger 232 and the fan 234. The braces 380 may be coupled to the legs 246 via fixed joints such as welds, removable joints such as threaded fasteners, or any combination thereof. Similarly, the legs 246 may be coupled to the horizontal supports or beams 376 and 378 via fixed joints such as welds, removable joints such as threaded fasteners, or any combination thereof.

The framework 314 also may include vertical supports or legs 382, 384, and 386 extending vertically upward from the horizontal supports or beams 376 and 378. The legs 382, 384, and 386 may be coupled to the horizontal supports or beams 376 and 378 via fixed joints such as welds, removable joints such as threaded fasteners, or a combination thereof. The framework 314 also includes angle supports or braces 388 and 390, which extend between and couple to the legs 382 and 384 and the horizontal supports or beams 376 and 378 at the mounting bracket 370 via fixed joints such as welds, removable joints such as threaded fasteners, or a combination thereof. The angle supports or braces 388 and 390 may be disposed at angles that are fixed or adjustable, such as by including adjustment mechanisms (e.g., a plurality of vertical mounting positions) along the legs 382 and 384.

The leg 386 also couples with conduit supports 392 and 394, which may be horizontal beams supported by angle supports or braces 396. The conduit supports 392 and 394 may be coupled to the leg 386 via a fixed joint such as a weld, a removable joint such as threaded fasteners, or a combination thereof. Similarly, the braces 396 may be coupled to the respective conduit supports 392 and 394 via fixed joints such as welds, removable joints such as threaded fasteners, or a combination thereof. The leg 386 also couples with a horizontal cross-support 398 extending between the horizontal supports or beams 376 and 378. The horizontal support 398 may be coupled to the horizontal supports or beams 376 and 378 via fixed joints such as welds, removable joints such as threaded fasteners, or a combination thereof. The conduit supports 392 and 394 provide support for the inlet conduit 320 between the flange coupling 322 and the connection with the heat exchanger 232.

As illustrated, the inlet conduit 320 includes the flange coupling 322, a straight conduit 400 coupled to the flange coupling 322, a gimbal 402 coupled to the straight conduit 400, an elbow 404 coupled to the gimbal 402, a straight conduit 406 coupled to the elbow 404, a gimbal 408 coupled to the straight conduit 406, an elbow 410 coupled to the gimbal 408, a straight conduit 412 coupled to the elbow 410, a gimbal 414 coupled to the straight conduit 412, and straight conduits 416 and 418 coupled together at a flange connection 420. The straight conduit 416 is coupled to the gimbal 414, the straight conduit 418 is coupled to the heat exchanger 232 via the heat exchange conduit 238 as discussed above with reference to FIG. 1, and the flange coupling 420 includes mating flanges 422 and 424 coupled together via a plurality of fasteners 426. The fasteners 426 may include threaded fasteners such as bolts, nuts, or any combination thereof. As illustrated, the straight conduit 400 is vertical or substantially perpendicular relative to the top wall 248, while the straight conduit 406, 412, 416, and 418 are generally horizontal or parallel relative to the top wall 248. Additionally, the straight conduits 400 and 406 are generally crosswise relative to one another, such as perpendicular via the turn at the elbow 404. Similarly, the straight conduits 406 and 412 are generally crosswise relative to one another, such as perpendicular to one another via the turn at the elbow 410.

The outlet conduit 324 extends between the flange coupling 328 and the heat exchanger 232, wherein the outlet conduit 324 may be coupled to the heat exchanger 232 via the heat exchange conduit 238 as discussed in detail above with reference to FIG. 1. As illustrated, the outlet conduit 324 may include an elbow 428 coupled to the flange coupling 328, a straight conduit 430 coupled to the elbow 428, an elbow 432 coupled to the straight conduit 430, a flange coupling 434 coupled to the elbow 432 and an elbow 436, and a straight conduit 438 coupled to the elbow 436. The flange coupling 434 includes opposite flanges 440 and 442 coupled together via a plurality of fasteners 444, such as threaded bolts, threaded nuts, or a combination thereof. The straight conduit 438 may be coupled to the heat exchanger 232 via the heat exchange conduit 238 and/or one or more additional fluid couplings. The straight conduits 418 and 438 also may be supported via one or more additional conduit supports coupled to the framework 314.

In certain embodiments, the inlet conduit 320 and the outlet conduit 324 may be coupled to the framework 314, such that the inlet and outlet conduits 320 and 324 are part of a self-contained package with the framework 314, the heat exchanger 232, the fan 234, and various other components of the air cooling system 18. Accordingly, the air cooling system 18 may be installed on the top wall 248 of the enclosure 188 by lowering the skid 312 onto the top wall 248, fastening the mounting brackets 370 and 372 onto the top wall 248 via the fasteners 374, and connecting the flange couplings 322 and 328 with the branch conduit 318 and the purged conduit 326 within the enclosure 188 as discussed above with reference to FIG. 2.

As illustrated, the skid 312 may further include a plurality of lift couplings 446 coupled to one or more of the legs 246, 382, and 384. The lift couplings 446 may include hooks, loops, or other connectors configured to connect with cables of a lift, such as a crane configured to lift and lower the air cooling system 18 onto the top wall 248 of the enclosure 188. Again, as discussed above, the air cooling system 18 is disposed in an environment surrounding the enclosure 188, such that the heat exchanger 232 and the fan 234 use ambient air to transfer heat away from the fuel purge flow in the inlet and outlet conduits 320 and 324. Accordingly, the air cooling system 18 may be used at any location without the need for a water supply or other coolant supply, which may not be available for use with the gas turbine system 10.

Figure 4:
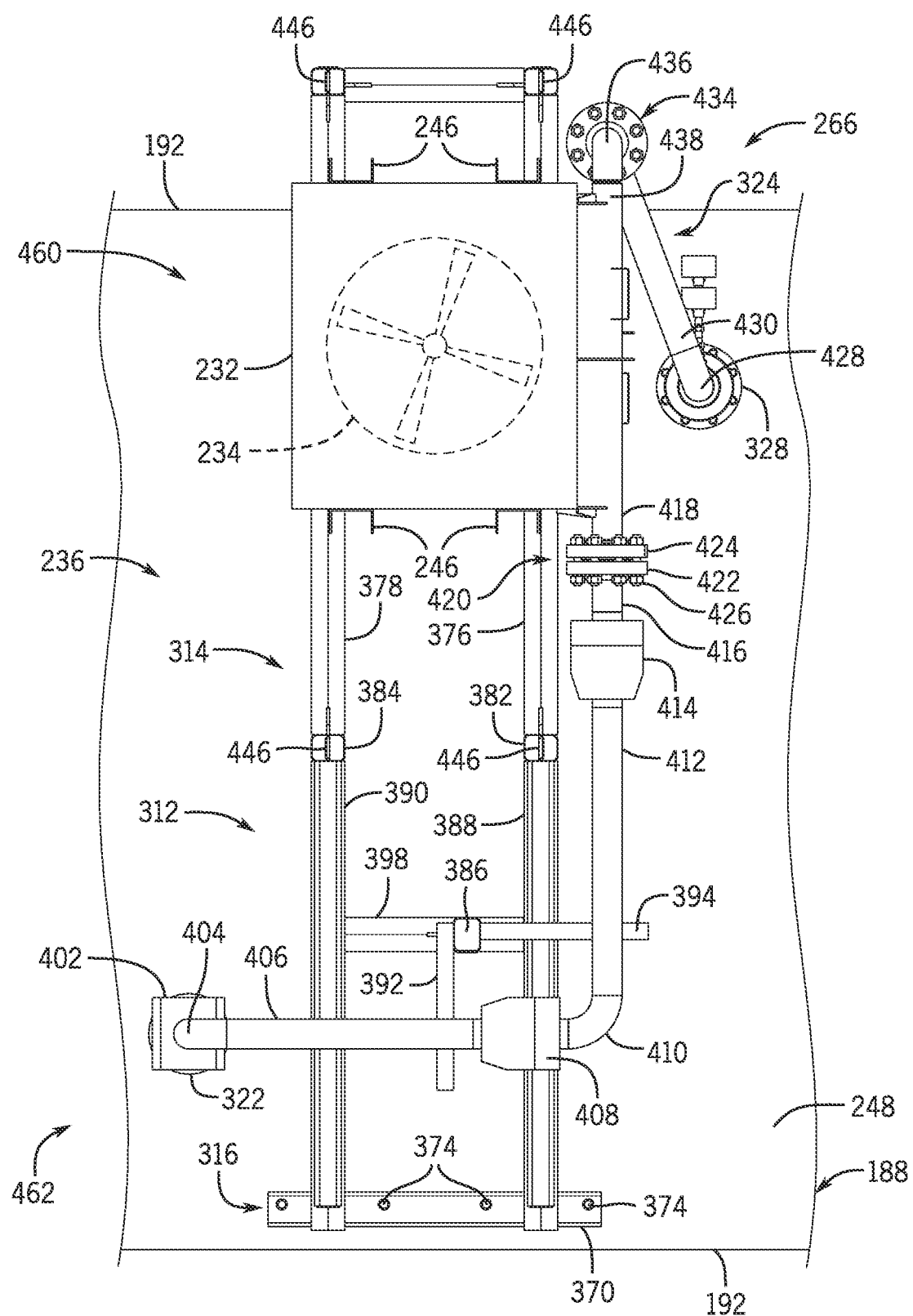
FIG. 4 is a partial top view of an embodiment of the gas turbine system of FIGS. 1-3, further illustrating the air cooling system of FIG. 3 mounted on the top wall of the enclosure.

FIG. 4 is a top view of an embodiment of the gas turbine system 10 of FIGS. 1-3, further illustrating details of the air cooling system 18 mounted on the top wall 248 as illustrated in FIG. 3. As illustrated in FIG. 4, the framework 314 has the mounting brackets 370 and 372 generally parallel with the opposite sidewalls 192, while the horizontal supports or beams 376 and 378 are generally perpendicular to the opposite sidewalls 192 and the mounting brackets 370 and 372. Additionally, the mounting brackets 370 and 372 are generally parallel to one another, and the horizontal supports or beams 376 and 378 are generally parallel with one another. The legs 246 are coupled to the horizontal support or beams 376 and 378 at a first end portion 460 of the skid 312, while the conduit supports 392 and 394 and the inlet conduit 320 are generally disposed at a second end portion 462 of the skid 312. As further illustrated in FIG. 4, the flange connections 322 and 328 are generally disposed on opposite sides of the skid 312 at the opposite first and second end portions 460 and 462. Accordingly, the skid 312 of the air cooling system 18 is generally disposed between the flange couplings 322 and 328 to help reduce the length of the inlet and outlet conduits 320 and 324, while also maintaining close proximity with the bleed system 14 and the fuel purge system 16 within the enclosure 188 as discussed above with reference to FIG. 2.

Figure 5:
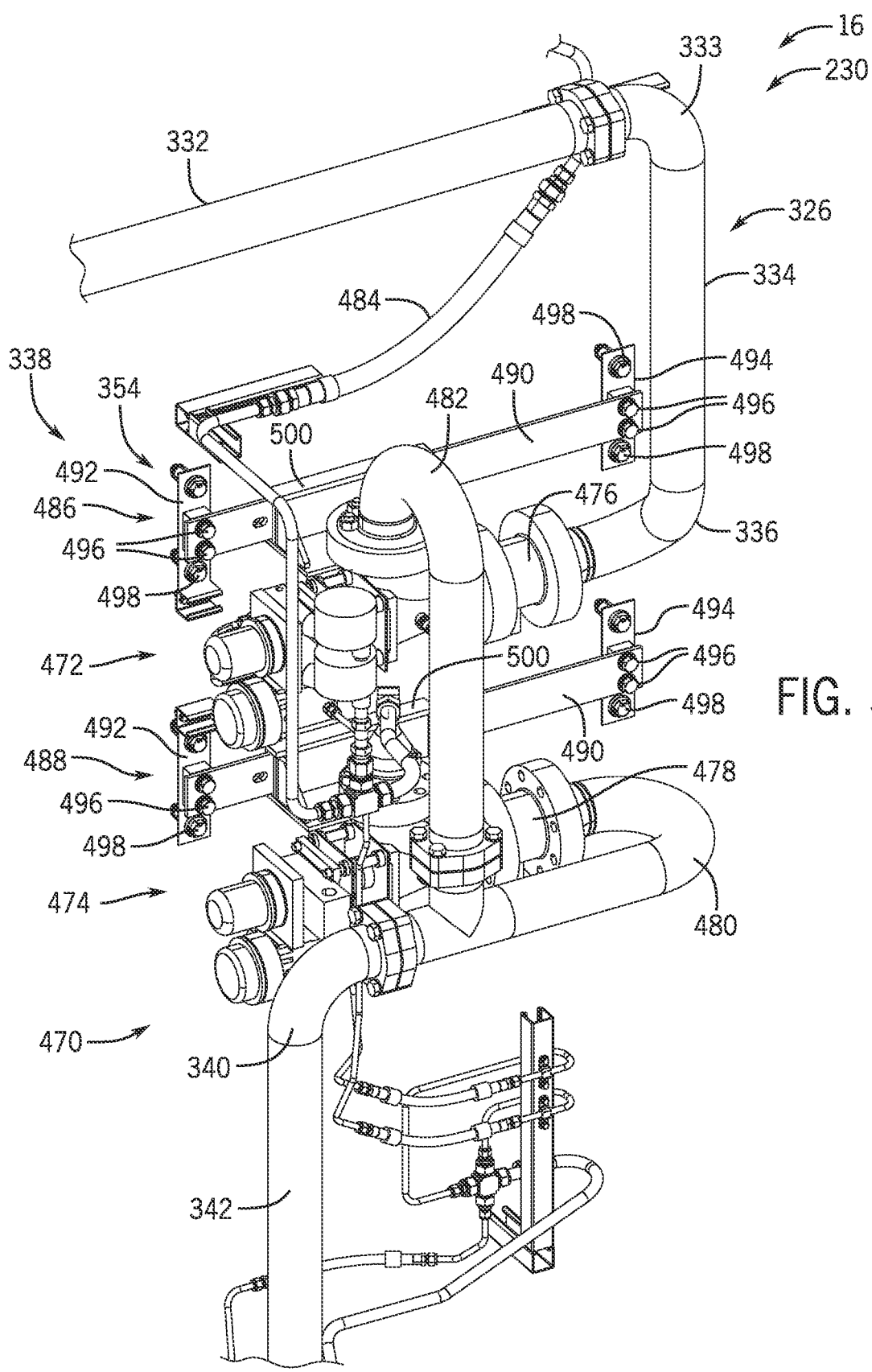
FIG. 5 is a partial perspective view of an embodiment of the fuel purge system of FIGS. 1 and 2, further illustrating details of a valve assembly and a wall mount along a purge conduit of the fuel purge system of FIG. 2.

FIG. 5 is a partial perspective view of the fuel purge system 16 of FIG. 2, further illustrating details of the purge conduit 326, the valve assembly 338, and the wall mount 354. As illustrated, the valve assembly 338 includes a double block and bleed valve assembly 470 having a block and bleed valve 472 and a block and bleed valve 474 disposed along the purge conduit 326. The illustrated valve assembly 338, including the double block and bleed valve assembly 470, is one non-limiting example of a valve assembly that may be used with the fuel purge system 16. The valve assembly 338 may be an off-the-shelf valve assembly or a custom valve assembly suitable for the temperatures and pressures associates with the gas turbine system 10. The block and bleed valve 472 is coupled to the purge conduit 326 at an inlet conduit 476 coupled to the elbow 336, while the block and bleed valve 474 is coupled to the purge conduit 326 at an inlet conduit 478 coupled to a J-shaped conduit 480 coupled to the elbow 340. Additionally, the J-shaped conduit 480 is coupled to a J-shaped conduit 482, which in turn is coupled to the inlet conduit 476. The double block and bleed valve assembly 470 is also coupled to a vent conduit 484, which is configured to vent or bleed a flow from the block and bleed valves 472 and 474.

The block and bleed valves 472 and 474 are also coupled to the wall mount 354, which includes wall mounts 486 and 488. Each of the wall mounts 486 and 488 includes a horizontal support or rail 490 extending between opposite mounting brackets 492 and 494. The mounting brackets 492 and 494 may be coupled to the horizontal support or rail 490 via a plurality of fasteners 496, such as threaded fasteners or bolts. Additionally, the mounting brackets 492 and 494 may be coupled to the sidewall 192 of the enclosure 188 via a plurality of fasteners 498, such as threaded fasteners or bolts. The horizontal supports or rails 490 may be generally parallel with one another in the wall mounts 486 and 488. Additionally, although the horizontal support or rails 490 are shown removably coupled with the mounting brackets 492 and 494, the horizontal support or rails 490 may be fixedly coupled to the mounting brackets 492 and 494 via a welded joint, a brazed joint, or a one piece construction of the components.

The wall mounts 486 and 488 further include a mating rail mount 500 configured to slide lengthwise along the horizontal support or rail 490. For example, the rail mount 500 may be coupled to the horizontal support or rail 490 via a hollow-rectangular coupling or a C-shaped coupling disposed about the horizontal support or rail 490, such that the rail mount 500 can move lengthwise along the horizontal support or rail 490 while blocking lateral separation away from the horizontal support or rail 490. In operation, the connection between the rail mount 500 and the horizontal support or rail 490 allows horizontal movement of the purge conduit 326 and the valve assembly 338 lengthwise along the horizontal support or rail 490 in each of the wall mounts 486 and 488. The horizontal movement enabled by the wall mounts 486 and 488 allows for thermal expansion and contraction of components, including the purge conduit 326 and sections of the gas turbine system 10, during operation of the gas turbine system 10.

Figure 6:
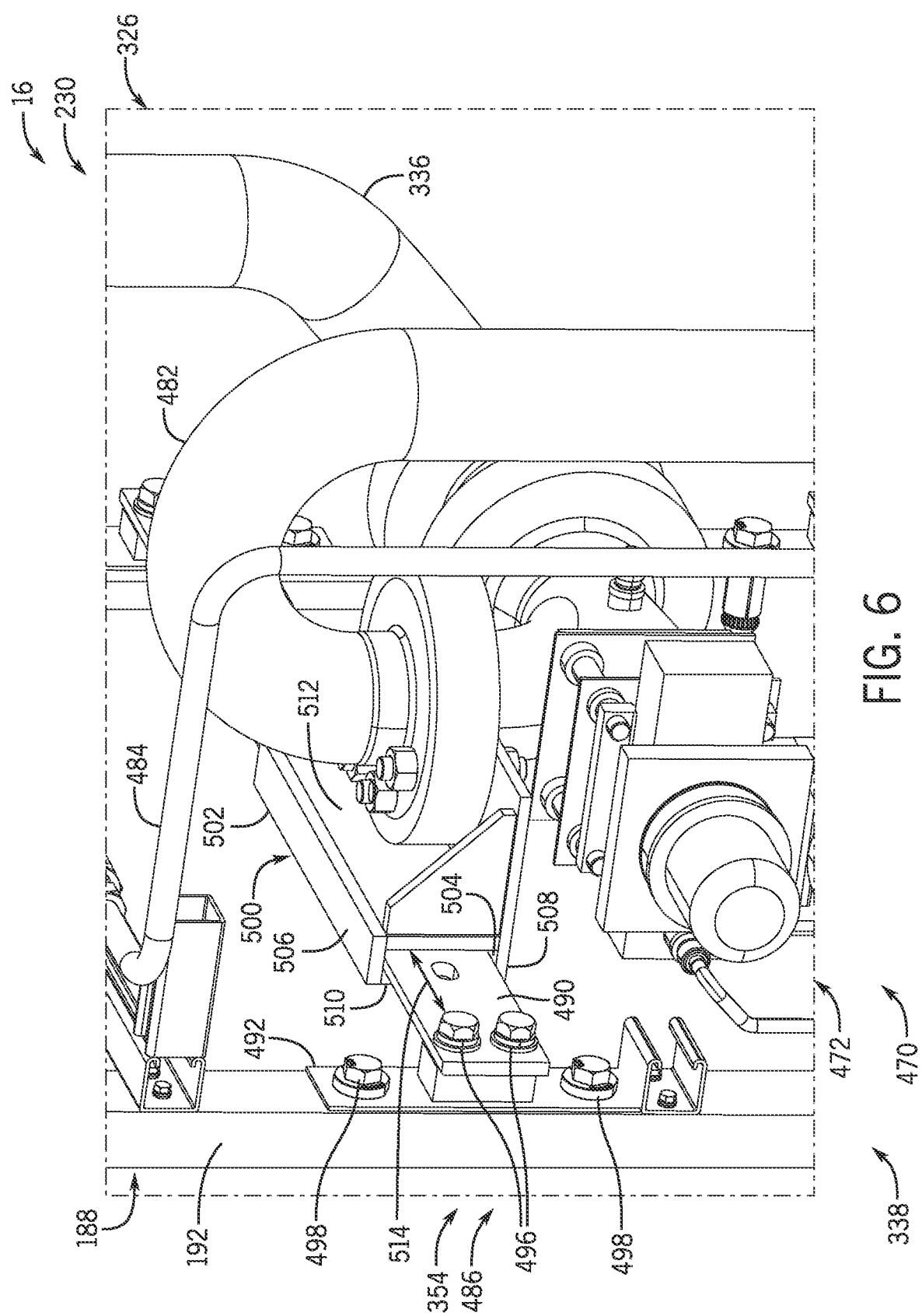
FIG. 6 is a partial perspective view of the fuel purge system of FIG. 5, further illustrating details of the wall mount.

FIG. 6 is a partial perspective view of an embodiment of the valve assembly 338 as illustrated in FIG. 5, further illustrating details of the wall mount 354. In particular, FIG. 6 illustrates a connection between the horizontal support or rail 490 and the rail mount 500 of the wall mount 486. The wall mount 488 has substantially the same construction as the wall mount 486. As illustrated in FIG. 6, the horizontal support or rail 490 is a flat rectangular plate extending from the mounting bracket 492 in a horizontal direction toward the mounting bracket 494. The rail mount 500 substantially surrounds the horizontal support or rail 490. For example, in the illustrated embodiment, the rail mount 500 includes a rectangular enclosure 502 defining a rectangular slot 504, which receives the horizontal support or rail 490. The rectangular enclosure 502 includes plates 506, 508, 510, and 512 arranged in a rectangular shape to define the rectangular enclosure 502 and the rectangular slot 504. For example, the plates 506 and 508 are substantially flat and parallel with one another, while the plates 510 and 512 are substantially flat and parallel with one another. Although the rail mount 500 of FIG. 6 has a rectangular enclosure 502, the rail mount 500 may include other types of attachment couplings (e.g., C-shaped couplings) configured to block separation between the rail mount 500 and the horizontal support or rail 490, while allowing movement of the rail mount 500 lengthwise along the horizontal support or rail 490 as indicated by arrow 514. Again, the wall mount 354 having the horizontal support or rail 490 and the rail mount 500 is configured to allow movement of the valve assembly 338 and the purge conduit 326 within the enclosure 188 to accommodate vibration, movement of parts, or other fitment issues within the enclosure 188. For example, the connection between the horizontal support or rail 490 and the rail mount 500 may accommodate thermal expansion and contraction of components within the gas turbine system 10.

Technical effects of the disclosed embodiments include air cooling, rather than water cooling, of a fuel purge system, which is configured to purge fuel (e.g., gas fuel and/or liquid fuel) from various fuel passages of a fuel supply system of a gas turbine system. The air cooling is achieved with an air cooling system mounted outside of an enclosure surrounding the gas turbine system, wherein the air cooling system includes one or more heat exchangers and fans. The air cooling system may be a self-contained system disposed on a skid, such that the skid can be mounted on a top wall of the enclosure and quickly connected to the fuel purge system. The air cooling system eliminates the need for a local water supply, which may not be available or feasible at certain sites.

The subject matter described in detail above may be defined by one or more clauses, as set forth below.

A system includes an air cooling system having a heat exchanger, a fan, and a mount. The heat exchanger includes an inlet, an outlet, and a heat exchange conduit between the inlet and the outlet. The inlet is configured to couple to a bleed system of a gas turbine system to extract a bleed flow. The heat exchanger is configured to cool the bleed flow along the heat exchange conduit in a surrounding air to produce a cooled bleed flow. The outlet is configured to couple to a fuel purge system of the gas turbine system to supply the cooled bleed flow as a fuel purge flow. The fan is configured to force an airflow from the surrounding air through the heat exchanger. The mount is configured to mount the air cooling system outside of an enclosure surrounding the gas turbine system.

The system of the preceding clause, including the gas turbine system disposed inside of the enclosure.

The system of any preceding clause, including a mobile power plant having the gas turbine system and the air cooling system mounted on one or more trailers.

The system of any preceding clause, including the enclosure, wherein the mount is coupled to a top wall of the enclosure.

The system of any preceding clause, including the enclosure, wherein the bleed system is disposed inside of the enclosure, and the bleed system is coupled to a compressor of the gas turbine system.

The system of any preceding clause, wherein a branch conduit is coupled to the bleed system, the branch conduit extends to a wall of the enclosure, and the inlet of the heat exchanger is coupled to the branch conduit via an inlet conduit.

The system of any preceding clause, wherein the branch conduit extends directly from the bleed system to the wall.

The system of any preceding clause, wherein the fuel purge system includes a purge conduit disposed inside of the enclosure, the purge conduit extends to the wall of the enclosure, and the outlet of the heat exchanger is coupled to the purge conduit via an outlet conduit.

The system of any preceding clause, wherein the fuel purge system includes a valve assembly disposed along the purge conduit, and the valve assembly includes a wall mount having a rail mount coupled to and movable along a rail.

The system of any preceding clause, wherein the mount includes a skid having a framework disposed on a base.

The system of any preceding clause, wherein the air cooling system includes an inlet conduit coupled to the inlet and extending to a first flange coupling configured to couple with a branch conduit of the bleed system inside of the enclosure, and an outlet conduit coupled to the outlet and extending to a second flange coupling configured to couple with a purge conduit of the fuel purge system inside of the enclosure.

The system of any preceding clause, wherein the first and second flange couplings are disposed on opposite sides of the skid.

The system of any preceding clause, wherein the first and second flange couplings are configured to couple with the branch conduit and the purge conduit, respectively, along a top wall of the enclosure, wherein the skid is configured to mount on the top wall of the enclosure.

The system of any preceding clause, wherein at least one of the inlet conduit and the outlet conduit is supported by the framework.

A method includes intaking, into an inlet of a heat exchanger of an air cooling system, a bleed flow extracted from a bleed system of a gas turbine system. The method further includes cooling, along a heat exchange conduit of the heat exchanger in a surrounding air, the bleed flow to produce a cooled bleed flow. The method further includes supplying, out of an outlet of the heat exchanger, the cooled bleed flow as a fuel purge flow into a fuel purge system of the gas turbine system. The method further includes forcing, via a fan of the air cooling system, an air flow from the surrounding air through the heat exchanger, wherein the air cooling system includes a mount configured to mount the air cooling system outside of an enclosure surrounding the gas turbine system.

The method of the preceding clause, including purging a fuel from a fuel supply system of the gas turbine engine via the fuel purge flow supplied to the fuel purge system.

The method of any preceding clause, including controlling a temperature of the fuel purge flow at least partially by controlling the air cooling system.

The method of any preceding clause, including mounting the air cooling system to a top wall of the enclosure via the mount.

A method includes mounting, via a mount, an air cooling system outside of an enclosure surrounding a gas turbine system. The air cooling system includes a heat exchanger having an inlet, an outlet, and a heat exchange conduit between the inlet and the outlet. The inlet is configured to couple to a bleed system of the gas turbine system to extract a bleed flow. The heat exchanger is configured to cool the bleed flow along the heat exchange conduit in a surrounding air to produce a cooled bleed flow. The outlet is configured to couple to a fuel purge system of the gas turbine system to supply the cooled bleed flow as a fuel purge flow. The air cooling system also includes a fan configured to force an airflow from the surrounding air through the heat exchanger.

The method of the preceding clause, wherein mounting the air cooling system includes coupling the mount to a wall of the enclosure and positioning the heat exchanger and the fan above the enclosure.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
    an air cooling system, comprising:
        a heat exchanger having an inlet coupled to an inlet conduit, an outlet coupled to an outlet conduit, and a heat exchange conduit between the inlet and the outlet, wherein the inlet conduit is configured to couple to a bleed conduit of a bleed system of a gas turbine system to extract a bleed flow, wherein the bleed conduit extends between a bleed inlet coupled to a compressor upstream from a combustor of the gas turbine system and a bleed outlet downstream from the combustor, wherein the heat exchanger is configured to cool the bleed flow along the heat exchange conduit in a surrounding air to produce a cooled bleed flow, wherein the outlet conduit is configured to couple to a fuel purge system of the gas turbine system to supply the cooled bleed flow as a fuel purge flow, wherein the inlet conduit directly feeds the bleed flow to the heat exchanger, wherein the outlet conduit directly feeds the cooled bleed flow to the fuel purge system;
        a fan configured to force an airflow from the surrounding air through the heat exchanger; and
        a top mount configured to mount the air cooling system outside of an enclosure surrounding the gas turbine system, wherein the top mount mounts the heat exchanger and the fan on a top wall of the enclosure when mounted to the enclosure, and the fan is configured to force the airflow to flow only outside of the enclosure without ventilating an interior of the enclosure.

2. The system of claim 1, comprising the gas turbine system having the compressor, the combustor, and a turbine disposed inside of the enclosure, wherein the top mount mounts the heat exchanger and the fan on the top wall of the enclosure.

3. The system of claim 2, comprising a mobile power plant having the gas turbine system and the air cooling system mounted on one or more trailers having wheels.

4. The system of claim 1, wherein the bleed conduit directly feeds the bleed flow along a main bleed flow path from the bleed inlet to the bleed outlet of the bleed conduit.

5. The system of claim 1, wherein the bleed system is configured to split a compressor flow of the compressor into the bleed flow through the bleed conduit and a main flow to the combustor.

6. The system of claim 1, comprising the enclosure, wherein the top mount mounts the heat exchanger and the fan on the top wall of the enclosure, wherein the bleed system is disposed inside of the enclosure, wherein a branch conduit is coupled to the bleed conduit of the bleed system, the branch conduit extends to the top wall of the enclosure, and the inlet of the heat exchanger is coupled to the branch conduit via the inlet conduit.

7. The system of claim 6, wherein the branch conduit extends directly from the bleed conduit of the bleed system to the wall, wherein the branch conduit directly feeds the bleed flow to the inlet conduit.

8. The system of claim 6, wherein the fuel purge system comprises a purge conduit disposed inside of the enclosure, the purge conduit extends to the top wall of the enclosure, and the outlet of the heat exchanger is coupled to the purge conduit via the outlet conduit.

9. The system of claim 8, wherein the fuel purge system comprises a valve assembly disposed along the purge conduit, and the valve assembly comprises a wall mount having a rail mount coupled to and movable along a rail.

10. The system of claim 1, wherein the top mount comprises a skid having a framework disposed on a base, the heat exchanger and the fan are disposed on the skid, and the skid comprises one or more lift couplings configured to enable a lift to raise and lower the skid relative to the top wall of the enclosure.

11. The system of claim 10, wherein the inlet conduit extends to and couples with a first flange coupling disposed at the top wall when the top mount is mounted to the top wall, wherein the first flange coupling couples with a branch conduit coupled to the bleed conduit of the bleed system inside of the enclosure, wherein the outlet conduit extends to and couples with a second flange coupling disposed at the top wall when the top mount is mounted to the top wall, wherein the second flange coupling couples with a purge conduit of the fuel purge system inside of the enclosure.

12. The system of claim 11, wherein the first and second flange couplings are disposed on opposite sides of the skid along the top wall when the top mount is mounted to the top wall.

13. The system of claim 11, comprising the enclosure, wherein the top mount mounts the heat exchanger and the fan on the top wall of the enclosure, wherein the first flange coupling couples the inlet conduit with the branch conduit at the top wall, wherein the second flange coupling couples the outlet conduit with the purge conduit at the top wall.

14. The system of claim 1, wherein the bleed outlet of the bleed conduit is configured to couple to an exhaust section of the gas turbine system, such that the bleed conduit bypasses the combustor and a turbine section of the gas turbine system between the bleed inlet and the bleed outlet of the bleed conduit.

15. A method, comprising:
intaking, into an inlet of a heat exchanger of an air cooling system, a bleed flow extracted from a bleed conduit of a bleed system of a gas turbine system, wherein the bleed conduit extends between a bleed inlet coupled to a compressor upstream from a combustor of the gas turbine system and a bleed outlet downstream from the combustor, wherein an inlet conduit directly feeds the bleed flow from the bleed conduit to the inlet of the heat exchanger;
cooling, along a heat exchange conduit of the heat exchanger in a surrounding air, the bleed flow to produce a cooled bleed flow;
supplying, out of an outlet of the heat exchanger, the cooled bleed flow as a fuel purge flow into a fuel purge system of the gas turbine system, wherein an outlet conduit directly feeds the cooled bleed flow from the outlet of the heat exchanger to the fuel purge system; and
forcing, via a fan of the air cooling system, an airflow from the surrounding air through the heat exchanger, wherein the air cooling system comprises a top mount that mounts the air cooling system outside of an enclosure surrounding the gas turbine system, the top mount mounts the heat exchanger and the fan on a top wall of the enclosure, and the fan forces the airflow to flow only outside of the enclosure without ventilating an interior of the enclosure.

16. The method of claim 15, comprising purging a fuel from a fuel supply system of the gas turbine engine via the fuel purge flow supplied to the fuel purge system.

17. The method of claim 15, comprising controlling a temperature of the fuel purge flow at least partially by controlling the air cooling system.

18. The method of claim 15, wherein the heat exchanger and the fan are disposed on a skid, and the skid comprises one or more lift couplings configured to enable a lift to raise and lower the skid relative to the top wall of the enclosure.

19. A method, comprising:
mounting, via a top mount, an air cooling system outside of an enclosure surrounding a gas turbine system, wherein the air cooling system comprises:
a heat exchanger having an inlet coupled to an inlet conduit, an outlet coupled to an outlet conduit, and a heat exchange conduit between the inlet and the outlet, wherein the inlet conduit is configured to couple to a bleed conduit of a bleed system of the gas turbine system to extract a bleed flow, wherein the bleed conduit extends between a bleed inlet coupled to a compressor upstream from a combustor of the gas turbine system and a bleed outlet downstream from the combustor, wherein the heat exchanger is configured to cool the bleed flow along the heat exchange conduit in a surrounding air to produce a cooled bleed flow, wherein the outlet conduit is configured to couple to a fuel purge system of the gas turbine system to supply the cooled bleed flow as a fuel purge flow, wherein the inlet conduit directly feeds the bleed flow to the heat exchanger, wherein the outlet conduit directly feeds the cooled bleed flow to the fuel purge system; and
a fan configured to force an airflow from the surrounding air through the heat exchanger only outside of the enclosure without ventilating an interior of the enclosure, wherein the top mount mounts the heat exchanger and the fan on a top wall of the enclosure.

20. The method of claim 19, wherein the heat exchanger and the fan are disposed on a skid, and the skid comprises one or more lift couplings configured to enable a lift to raise and lower the skid relative to the top wall of the enclosure.

* * * * *